(12) United States Patent
Larsen et al.

(10) Patent No.: US 8,171,959 B2
(45) Date of Patent: May 8, 2012

(54) DAMPENER APPARATUS AND METHOD

(75) Inventors: Leif Steen Larsen, Hedenhusene (DK); Wolfgang Schubert, Karup (DK); Ole Poulsen, Engesvang (DK)

(73) Assignee: SPX APV Danmark A/S, Silkeborg (DK)

( * ) Notice: Subject to any disclaimer, the term of this patent is extended or adjusted under 35 U.S.C. 154(b) by 700 days.

(21) Appl. No.: 12/341,491

(22) Filed: Dec. 22, 2008

(65) Prior Publication Data

US 2010/0154910 A1     Jun. 24, 2010

(51) Int. Cl.
*F16L 55/04* (2006.01)
(52) U.S. Cl. .......................................... 138/30
(58) Field of Classification Search ................ 138/30
See application file for complete search history.

(56) References Cited

U.S. PATENT DOCUMENTS

| | | | | |
|---|---|---|---|---|
| 2,416,025 A | * | 2/1947 | Shaff | 138/26 |
| 2,561,528 A | * | 7/1951 | Meyers | 138/30 |
| 2,773,455 A | * | 12/1956 | Mercier | 417/540 |
| RE24,390 E | * | 11/1957 | Everett | 138/30 |
| 3,493,001 A | * | 2/1970 | Bevandich | 137/14 |
| 3,945,767 A | | 3/1976 | Rokadia | |
| 4,224,148 A | * | 9/1980 | Lindman et al. | 210/714 |
| 4,340,473 A | * | 7/1982 | Lindman et al. | 210/173 |
| 5,797,430 A | * | 8/1998 | Becke et al. | 138/30 |
| 5,971,027 A | * | 10/1999 | Beachley et al. | 138/31 |

FOREIGN PATENT DOCUMENTS

| | | |
|---|---|---|
| AT | 414034 B | 8/2006 |
| DE | 954571 C | 12/1956 |
| DE | 1179429 B | 8/1964 |
| DE | 1728148 A1 | 3/1972 |
| EP | 0976925 A2 | 2/2000 |
| WO | 02064977 A1 | 8/2002 |

* cited by examiner

*Primary Examiner* — James Hook
(74) *Attorney, Agent, or Firm* — Baker & Hostetler LLP

(57) ABSTRACT

A dampener device extending along a vertical axis for use with an industrial process having a first conduit through which process fluid flows along with a second conduit wherein the second conduit extends away from the first conduit generally along the vertical axis. The dampener also includes a third conduit having that is connected to the first conduit, wherein the third conduit extends away from the first conduit generally along the vertical axis in opposing relationship to the second conduit. The dampener device design further includes a dampener valve positioned the first conduit and a fourth conduit extending in opposing relation to the first conduit between the second and third conduits.

17 Claims, 5 Drawing Sheets

DAMPENER APPARATUS AND METHOD

FIELD OF THE INVENTION

The present invention relates generally to dampener devices and methods for the operation thereof. More particularly, the present invention relates to pulsation dampeners and the use and employment of such dampeners in industrial processes having fluid pumping systems utilizing piston pumps, plunger pumps, homogenizers and/or the like.

BACKGROUND OF THE INVENTION

Generally, fluid-pumping systems utilize a high pressure pump, such as a displacement pump or reciprocating piston pump, to force or flow fluid through said system. One such fluid pumping system is a homogenization system which employs a high pressure pump or homogenizer.

Homogenization is a process utilized within the food industry, where it is employed for size reduction of the fat globules in the product being processed and thereby preventing separation of the fat from the rest of the product. Almost all consumer milk and many food products are homogenized today. The use of the homogenization process within the food industry entails that extremely stringent demands on hygiene are placed on not only the homogenizers but also on all ancillary equipment.

During industrial processes such homogenization, the flow of product oftentimes pulsates as said pressure pulsations are known to oftentimes occur in fluids being pumped by reciprocating-piston pumps or the like. Such pulsations are known to occur even if pumps with multiple pistons having staggered cycles are used to pump fluids into common lines. Accordingly, in order to avoid the risk to the pump and ancillary equipment from said pulsations, such systems are oftentimes provided with dampeners. For example, pulsation dampeners are often times utilized to suppress or dampen such pulsations.

In its simplest form, a pulsation dampener consists of at least one partly air-filled upright tube in fluid communication with the piston pump. Many homogenizer systems available on the market employ such pulsation dampeners. Oftentimes the systems position the dampeners on both the suction side and the pressure side of the piston pump or reciprocating pump.

Typically, while the pulsation dampeners are successful in dampening, they are not designed for being cleaned in place (CIP), i.e., for being cleaned without disassembly. Rather, such pulsation dampeners have interior regions where products can collect, so as to form contaminants in subsequent operations with different products. Moreover, such pulsation dampeners cannot be easily disassembled for inspection, cleaning, sterilization or repair.

Current dampening systems have other drawbacks. As said dampener systems are in operation, the air entrapped in the upright tube will, in due course, be "consumed" by the product flow. Oftentimes it is not possible to replenish air while the system is in operation, but it has instead it is necessary to shut down the system, which entails both time loss and the loss of product. Requirements on higher output capacities and longer running times, for example within the food industry, as well as the use of higher pressure within the systems require that the pulsation dampeners will attain far too short an operational running time. The air in the upright tubes is consumed rapidly and production stoppages become necessary.

Accordingly, it is desirable to provide a pulsation dampener that operates efficiently in high pressure environments. Moreover, it is desirable to provide a pulsation dampener which can easily be cleaned utilizing the industrial process's CIP system, i.e., cleaned without being disassembled, or with minimal disassembly.

SUMMARY OF THE INVENTION

At least in view of the above, it would be desirable to provide relatively a pulsation dampener that operates efficiently in high pressure environments. Moreover, it is desirable to provide a pulsation dampener which can easily be cleaned utilizing the industrial process's CIP system, i.e., cleaned without being disassembled, or with minimal disassembly.

The foregoing needs are met, to a great extent, by certain embodiments of the present invention. For example, according to one embodiment of the present invention, A dampener device extending along a vertical axis for use with an industrial process comprising: a first conduit through which process fluid flows; a second conduit having a first and second end connected to said first conduit, wherein said second conduit extends away from said first conduit generally along the vertical axis; a third conduit having a first and second end connected to said first conduit, wherein said third conduit extends away from said first conduit generally along the vertical axis in opposing relationship to said second conduit; a dampener valve positioned on said first conduit; and a fourth conduit extending in opposing relation to said first conduit, said fourth conduit extending between said second and third conduits.

In accordance with another embodiment of the present invention, A dampening system for use with an industrial process having fluid flow, comprising: a first dampener device having a vertical axis comprising: a first conduit through which process fluid flows; a second conduit having a first and second end connected to said first conduit, wherein said second conduit extends away from said first conduit generally along the vertical axis; a third conduit having a first and second end connected to said first conduit, wherein said third conduit extends away from said first conduit generally along the vertical axis in opposing relationship to said second conduit; a first dampener valve positioned on said first conduit; and a fourth conduit extending in opposing relation to said first conduit, said fourth conduit extending between said second and third conduits; a first air valve connected to said fourth conduit; a first diverter valve positioned on said first conduit, wherein said first diverter valve controls the fluid flow to said dampener device; a bypass conduit connected to said first diverter valve; and a reciprocating pump having an inlet side and an outlet side, wherein said dampener device is connected to and in fluid communication with one of the inlet side or the outlet side of said reciprocating pump.

In accordance with yet another embodiment of the present invention, a method for dampening an industrial process fluid, said method comprising: providing a dampener device comprising: a first conduit through which process fluid flows; a second conduit having a first and second end connected to said first conduit, wherein said second conduit extends away from said first conduit generally along the vertical axis; a third conduit having a first and second end connected to said first conduit, wherein said third conduit extends away from said first conduit generally along the vertical axis in opposing relationship to said second conduit; a dampener valve positioned on said first conduit; and a fourth conduit extending in opposing relation to said first conduit, said fourth conduit extending between said second and third conduits, wherein the fourth conduit has an air valve connected thereto and the air is in fluid communication with a pressurized air source dampening the industrial process fluid as the industrial process fluid flows through the second and third conduits by applying pressurized air to the industrial process fluid.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
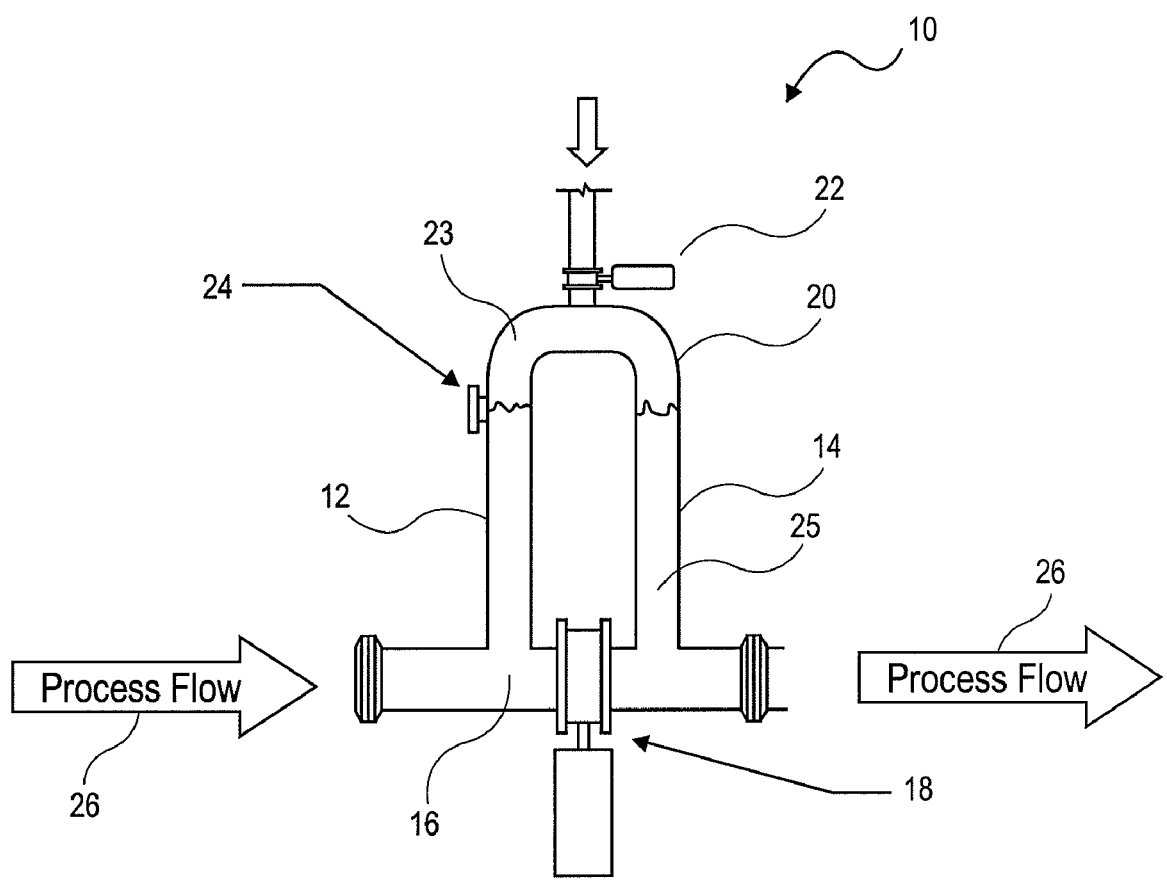
FIG. 1 is a schematic view of a industrial process line incorporating pulsation dampeners in accordance with an embodiment of the present invention.

The invention will now be described with reference to the drawing figures, in which like reference numerals refer to like parts throughout. FIG. 1 is a schematic illustration of a pulsation dampener design, generally designated 10, in accordance with an embodiment of the present invention for use in connection with an industrial process line or the like employing a high pressure pump, reciprocating pump such as homogenizers. For exemplary purposes, a homogenization system is described and depicted herein however the present invention is not limited to homogenization processes and/or apparatuses. As illustrated, the pulsation dampener 10 includes a first partly air filled upright dampener tube 12 and a second partly air filled upright dampener tube 14. The first and second dampener tubes 12, 14, are interconnected and in fluid communication with one another by means of a liquid flow conduit 16, having a dampener valve 18 disposed thereon. The first and second dampener tubes 12, 14 are also interconnected with one other via an upper air conduit 20. The upper air conduit is connected to a pressurized air source (not pictured) via an air valve 22. The pulsation dampener 10 also includes a site glass or level sensor 24 disposed on at least one of the upright tubes 12, 14.

As illustrated in FIG. 1, the pulsation dampener 10 comprises a dampener valve 18 disposed on the conduit 16, preferably between the first and second upright dampener tubes 12, 14. In one embodiment of the present invention, the dampener valve 18 is a shut-off valve that can be either opened or closed, and does not offer any additional flow path. The flow of industrial process fluid through said valve 18 during operation of the pulsation dampener 10 is designated by arrows 26. While the dampener valve 18 may incorporate any sort of shut-off design, various preferred designs of the valve 18 may include a butterfly valve design, a gate valve design or a ball valve design.

Also as illustrated in FIG. 1, the air valve 22 is preferable positioned on the upper air conduit 20 and connected to a pressurized air source (not pictured). The air valve 22, like the dampener valve 18, preferably only operates in the open or closed position and does not offer additional flow paths. The air valve may be a butterfly valve, ball valve, diaphragm valve, globe valve however other on/off type flow valves may be utilized.

As the name suggests, the upper air conduit 20 is usually filled with pressurized air during the operation of the pulsation damper 10 as reference by numeral 23. The pressurized air 23 abuts the process fluid 25 and provides a dampening effect with respect to fluid flow pulsations. As depicted in FIG. 1, the upper air conduit 20 has a generally U-shaped geometry or configuration however this geometry may vary from application to application. The upper air conduit 20 may be integral to the dampener tubes 12, 14, forming a single, unitary piece. Alternatively, the upper air conduit 20 may be separately attached or connected to each individual dampener tube 12, 14 via any mechanical means, for example, weld attachment, clamp attachment, bracketing, etc.

Figure 2:
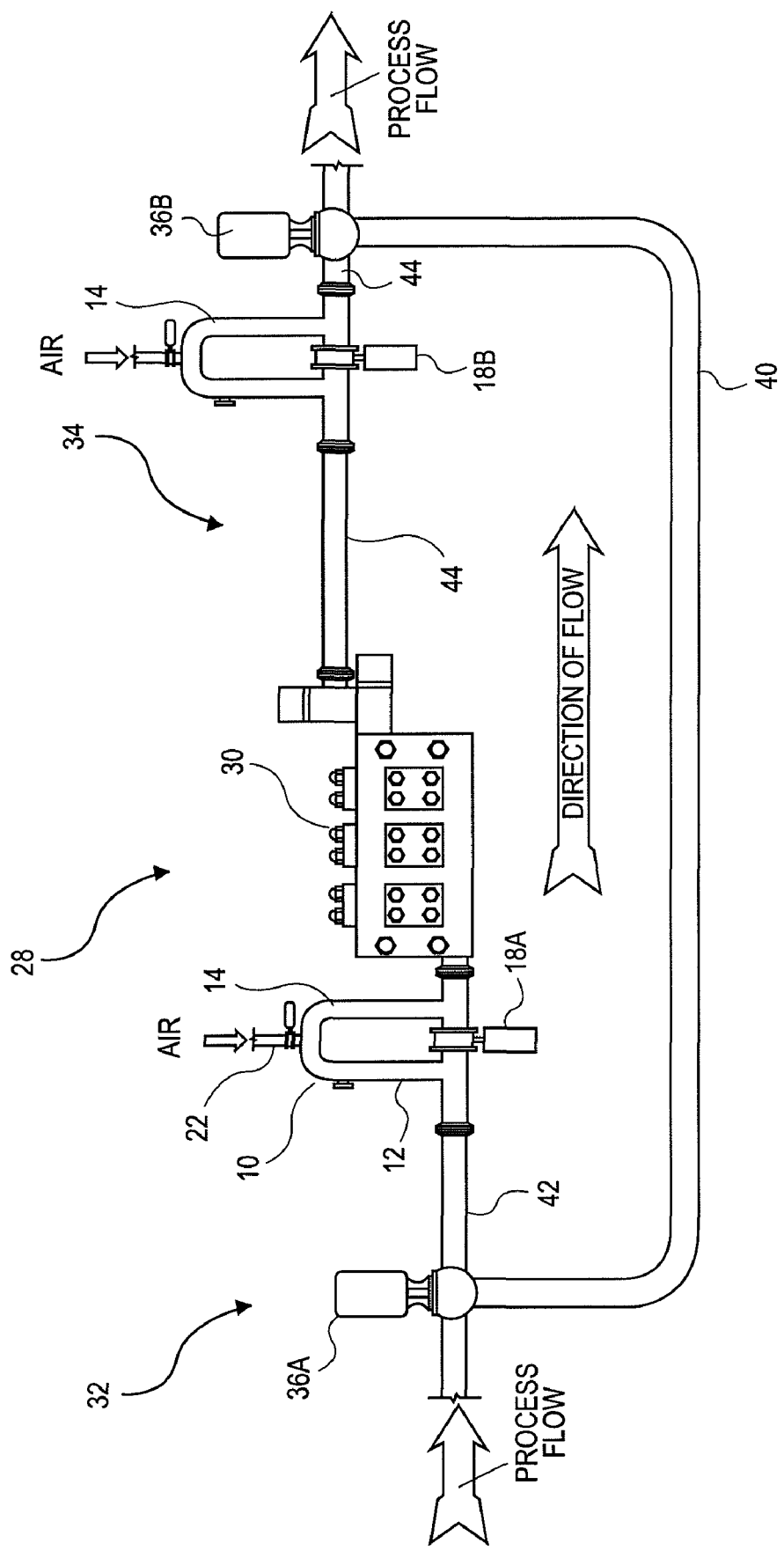
FIG. 2 is a detailed schematic view of a pulsation dampener in accordance with an embodiment of the present invention.

Turning to FIG. 2, an industrial process system, generally designated 28 is illustrated. While the pulsation dampener 10 of the current invention may be utilized with various industrial processes and methods, FIG. 2 illustrates a homogenization system which employs an embodiment of the pulsation dampener 10 of the present invention. As illustrated in FIG. 2, the homogenization system 28 includes a homogenizer 30 having a pulsation dampener 10 positioned at the inlet side of the homogenizer 30, generally designated 32, and the outlet side of the homogenizer 30, generally designated 34.

The homogenization system 28 also includes a diverter valve 36 located on the inlet side of the homogenizer 30 and a diverter valve 38 located on the outlet side of the homogenizer 30. As illustrated in FIG. 2, the diverter valves 36, 38 are connected and in fluid communication with one another via a bypass conduit 40. The diverter valve 36 is in fluid communication with the pulsation dampener 10 positioned on the inlet side 32 via an inlet conduit 42 while the diverter valve 38 is in fluid communication with the pulsation dampener 10 positioned on the outlet side 34 via an outlet conduit 44.

The diverter valves 36, 38 are preferably "three position" valves allowing for flow from one position to another while blocking flow to any other positions on the valve body. More specifically, during operation, in a first position, the diverter valves 36, 38 allow process fluid to flow through the inlet pulsation dampeners 10 and homogenizer 30 while preventing flow through the bypass 40 in a first position. In an alternate, second position, the diverter valves allow for flow through the bypass conduit 40, while preventing flow through the pulsation dampeners 10 and homogenizer 30.

While the homogenization system 28 is depicted with dual pulsation dampeners 10 in FIGS. 2-5, one located on the inlet side of the homogenizer 30, and one positioned on at the outlet side of the homogenizer 30, this proposed arrangement is exemplary only. For example, industrial processes embodied by the present invention may include processes that employ a single pulsation dampener, or alternatively some industrial processes may employ multiple pulsation dampeners numbering greater than two.

Figure 3:
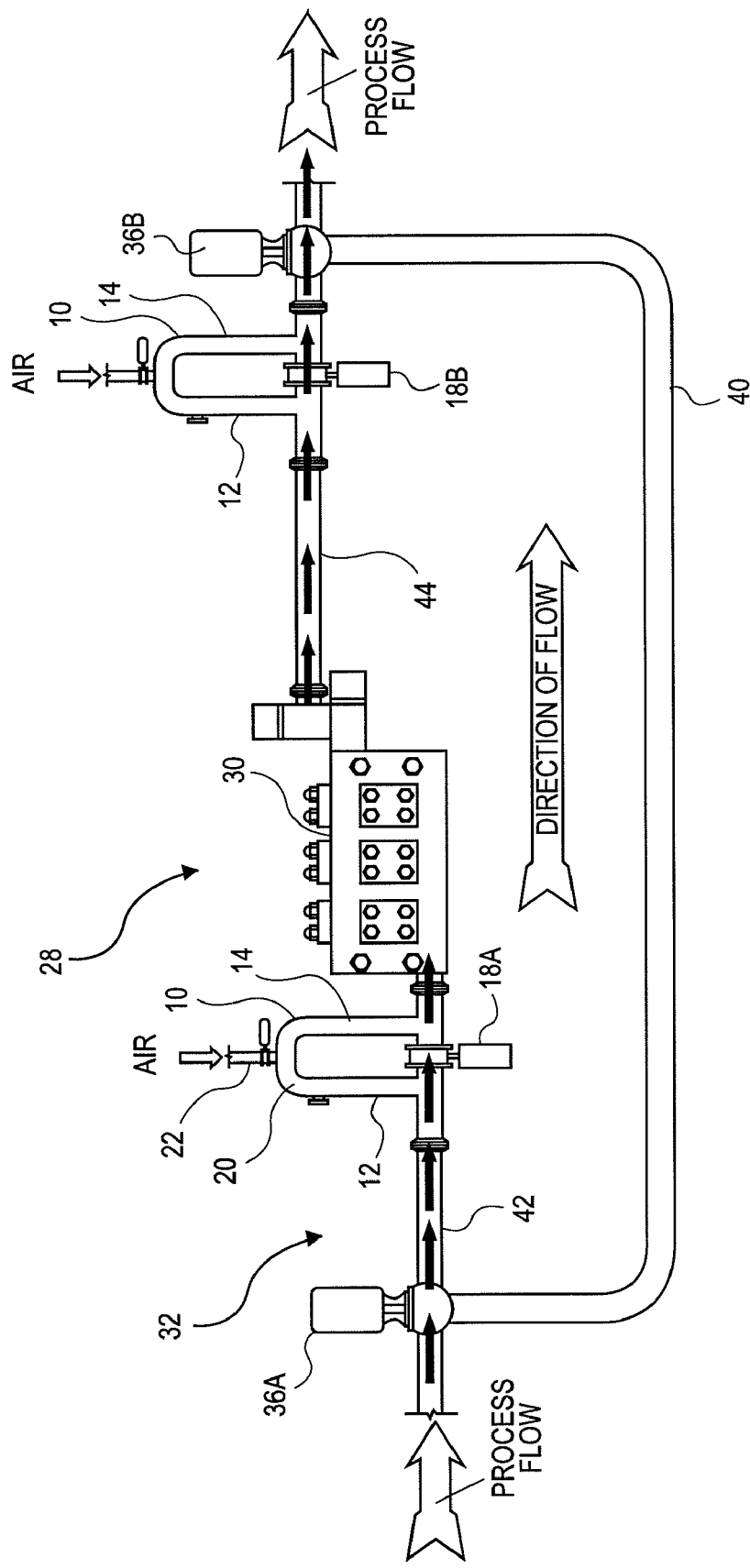
FIG. 3 is a schematic view of industrial process utilizing pulsation dampeners during operation in accordance with an embodiment of the present invention.

Now turning to FIG. 3, the homogenization system 28 is illustrated during industrial, process operation. During said operation, the inlet diverter valve 36(*a*) is in a first position wherein it allows the process flow of liquid through the conduit 42 and into the pulsation dampener 10 positioned at the inlet 32, as indicated by the arrows. In this first position, the dampener valve 18(*a*) is also open, allowing process fluid flow into the respective upright tubes 12, 14 wherein any pulsating fluid is suppressed or dampened. The fluid then proceeds to flow into the homogenizer 30. The process fluid then exits the homogenizer 30 via the conduit 44 and enters the pulsation dampener 10 position at the outlet side 34 of the homogenizer 30. Like the diverter valve 36(*a*) and dampener valve 18(*a*) previously discussed in connection with the inlet side 32, in this first position, both valves are open 36(*b*), 18(*b*), allowing the industrial process fluid to flow into the respective upright tubes 12, 14 dampening any residual pulsating fluid flow. Also while in this first position, the diverter valve 36(*b*) allows the process flow to exit the system 28.

Figure 4:
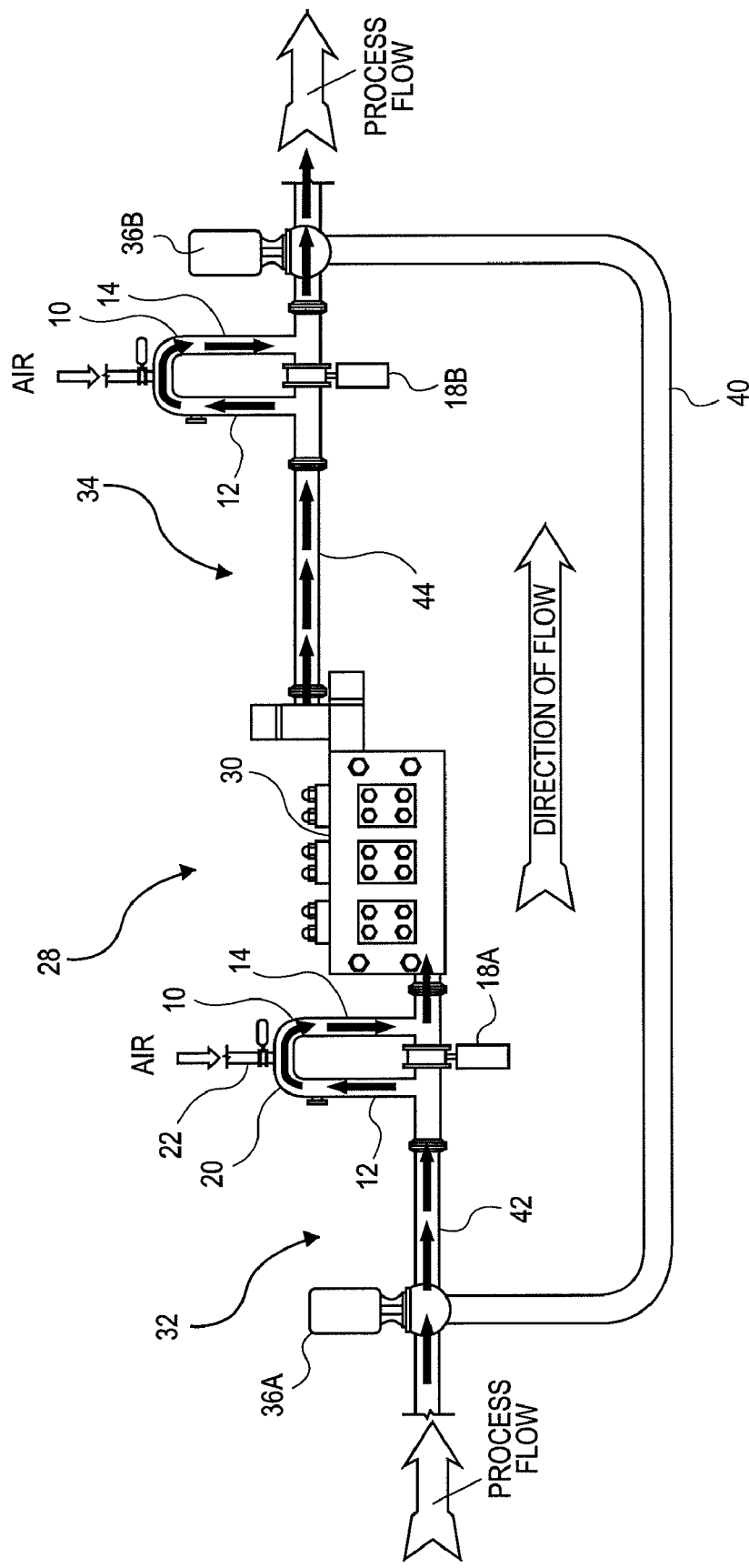
FIG. 4 is a schematic view of the industrial process depicted in FIG. 3, during a cleaning process.

Referring now to FIG. 4, the homogenization system 28 is depicted during a cleaning cycle where the system is cleaned in place (CIP). During the cleaning of the homogenization system 28, the inlet diverter valve 36(*a*) is in a second position where it once again allows process flow of liquid through the conduit 42 and into the pulsation dampener 10 positioned at the inlet 32 as indicated by the arrows. However unlike the previously described first position, in this second position the dampener valve 18(*a*) is closed, forcing the industrial process fluid flow through the upright dampener tube 12 and into to the upright dampener tube 14 via the upper air conduit 20 as indicated by the arrows. The industrial process flow then proceeds into the homogenizer 30 and exits the homogenizer 30 via the conduit 44. The process flow proceeds to enter the pulsation dampener 10 positioned at the outlet side 34 of the homogenizer 30 as indicated by the arrows. Like the dampener valve 18(*a*) previously discussed in connection with the inlet side 32, in this second position, the dampener valve 18(*b*) is closed, forcing the process fluid to flow through the upright dampener tube 12 and onto to the upright dampener tube 14 via the upper air conduit 20 as indicated by the arrows. The fluid then exits the system 28 via the diverter valve 36(*b*).

Figure 5:
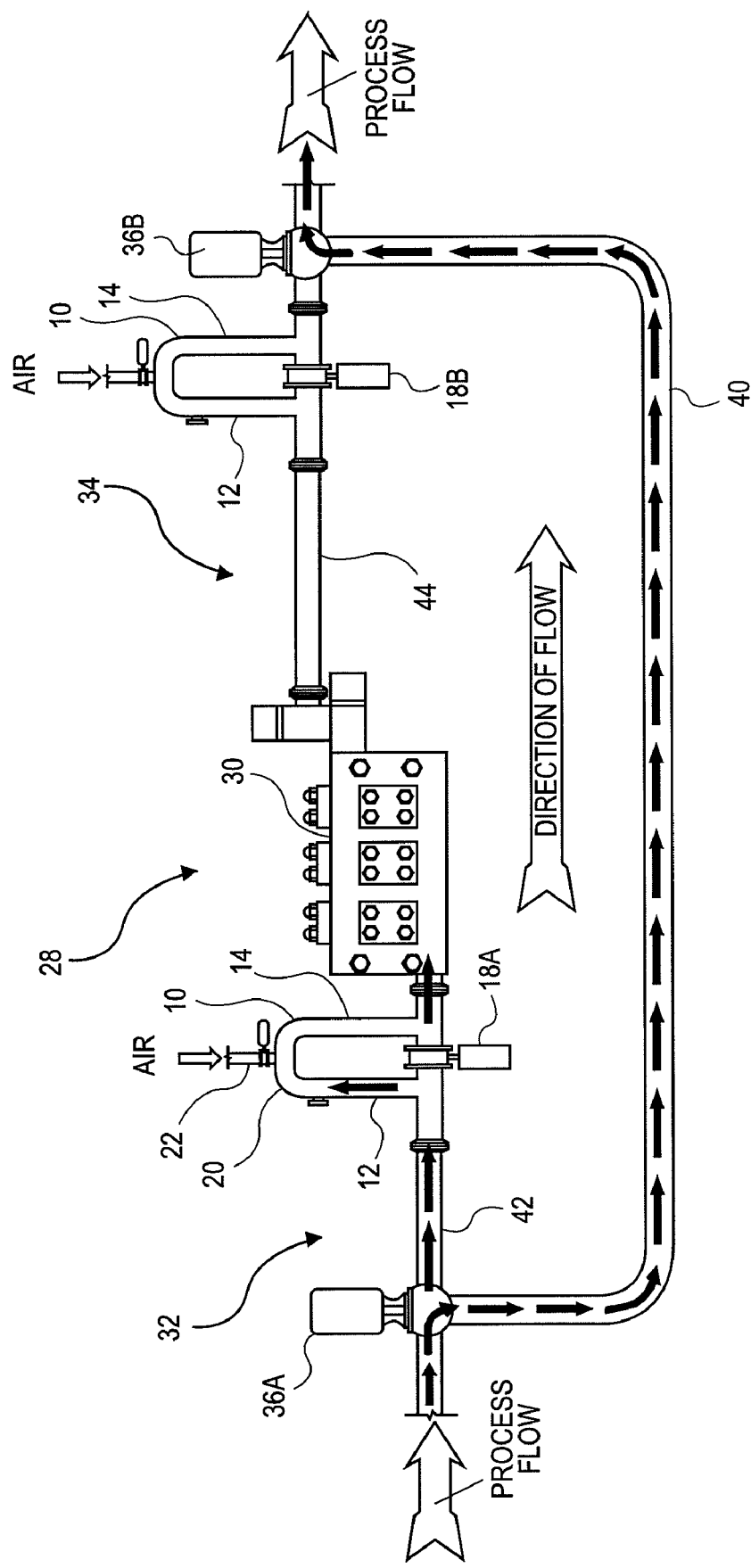
FIG. 5 is a schematic view of the industrial process depicted in FIG. 3, during the bypass cleaning flow operation.

Referring now to FIG. 5, the homogenization system 28 is depicted during another cleaning cycle, wherein the system is once again cleaned in place (CIP). FIG. 5 depicts a bypass cleaning cycle wherein the cleaning flow travels through the bypass conduit, bypassing the homogenizer 30 and the pulsation dampeners 10. During the aforementioned bypass cleaning cycle, the inlet diverter valve 36(*a*) is in a third position where it forces the process flow of liquid through the bypass conduit 40 and as indicated by the arrows. In this third position, and prevents the flow of fluid is presented from traveling into the pulsation dampener 10 and into the homogenizer 30.

During the illustrated cleaning cycle, the process flow proceeds through the bypass conduit as indicated until it reaches the diverter valve 36(*b*). As discussed in connection with the diverter valve 36(*a*), the diverter valve 36(*b*) is also in the third position, therefore preventing flow from entering the outlet conduit 44, and directing process flow out of the homogenizer system 28. This above-described cleaning cycle allows for the system 28 to be cleaned in place by flushing the system 28 with cleaning flow without the cleaning flow traveling through the homogenizer and 30 and pulsation dampeners 10.

As is apparent from the foregoing description, the present invention discloses a dampener device for a reciprocating pump, piston pump or the like, for example a homogenizer, which may be employed on both the inlet side and/or the outlet side to the homogenizer. Alternatively, the dampener may be utilized singularly at either the inlet side or on that side of a reciprocating pump, piston pump or the like. Moreover, the dampener device is designed so that air may be replenished via the pressurized air source to the upright tubes during operation, which minimizes production stoppages and thereby reduces any possible product losses caused by dampeners. Furthermore, the present invention discloses a dampener device that may be cleaned in place with little or no disassembly.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A dampening system for use with an industrial process having fluid flow, comprising:
    a first dampener device having a vertical axis comprising:
        a first conduit through which process fluid flows;
        a second conduit having a fist and second end connected to said first conduit, wherein said second conduit extends away from said first conduit generally along the vertical axis;
        a third conduit having a first and second end connected to said first conduit, wherein said third conduit extends away from said first conduit generally along the vertical axis in opposing relationship to said second conduit;
        a first dampener valve positioned on said first conduit; and
        a fourth conduit extending in opposing relation to said first conduit, said fourth conduit extending between said second and third conduits;
    a first air valve connected to said fourth conduit;
    a first diverter valve positioned on said first conduit, wherein said first diverter valve controls the fluid flow to said dampener device;
    a bypass conduit connected to said first diverter valve; and
    a reciprocating pump having an inlet side and an outlet side, wherein said dampener device is connected to and in fluid communication with one of the inlet side or the outlet side of said reciprocating pump;
    a second dampener device in fluid communication with said first dampener device, having a vertical axis connected to and in fluid communication with one of the inlet side or the outlet side of said reciprocating pump, said second dampener device comprising:
        a fifth conduit through which process fluid flows;

a sixth conduit having a fist and second end connected to said first conduit, wherein said sixth conduit extends away from said fifth conduit generally along the vertical axis;
a seventh conduit having a first and second end connected to said fifth conduit, wherein said seventh conduit extends away from said fifth conduit generally along the vertical axis in opposing relationship to said second conduit;
a second dampener valve positioned on said fifth conduit;
an eighth conduit extending in opposing relation to said fifth conduit, said eight conduit extending between said sixth and seventh conduits; and
a second air valve connected to said eighth conduit.

2. The dampener device according to claim 1, further comprising an air valve connected to said fourth conduit.

3. The dampener device according to claim 2, wherein said second conduit comprises a level sensor.

4. The dampener device according to claim 2, wherein said second conduit comprises a site glass.

5. The dampener device according to claim 1, wherein said dampener valve is one of a butterfly valve, gate valve and ball valve.

6. The dampener device according to claim 1, wherein said air valve is one of a butterfly valve, gate valve, ball valve, diaphragm valve and globe valve.

7. The dampener device according to claim 1, wherein said fourth conduit is integrally connected to said second and third conduits at each conduits second end wherein said for end of each of said second and third conduits is connected to said first conduit.

8. The dampener device according to claim 7, wherein said fourth conduit has a U-shaped geometry.

9. The dampener device according to claim 1, said dampener valve is position between said second conduit and said third conduit.

10. The dampener device according to claim 1, wherein said second and said third conduits are each partially air-filled.

11. The dampener system according to claim 1, further comprising a second diverter valve positioned on said fifth conduit.

12. The dampener system according to claim 1, wherein said first dampener device is positioned as the inlet side of said reciprocating pump and wherein said second dampener device is positioned on the outlet side of said reciprocating pump.

13. The dampener system according to claim 1, wherein said reciprocating pump is a homogenizer.

14. The dampener system according to claim 1, wherein said bypass conduit connected to said second diverter valve and interconnects said first and said second diverter valves.

15. The dampener system according to claim 1, wherein said first and second dampener valves are one of a butterfly valve, gate valve and ball valve.

16. The dampener device according to claim 1, wherein said air valves are one of a butterfly valve, gate valve, ball valve, diaphragm valve and globe valve.

17. A method for dampening an industrial process fluid, said method comprising;
providing a first dampener device having a vertical axis comprising:
a first conduit through which process fluid flows;
a second conduit having a fist and second end connected to said first conduit, wherein said second conduit extends away from said first conduit generally along the vertical axis;
a third conduit having a first and second end connected to said first conduit, wherein said third conduit extends away from said first conduit generally along the vertical axis in opposing relationship to said second conduit;
a first dampener valve positioned on said first conduit; and
a fourth conduit extending in opposing relation to said first conduit, said fourth conduit extending between said second and third conduits;
a first air valve connected to said fourth conduit;
a first diverter valve positioned on said first conduit, wherein said first diverter valve controls the fluid flow to said dampener device;
a bypass conduit connected to said first diverter valve; and
a reciprocating pump having an inlet side and an outlet side, wherein said dampener device is connected to and in fluid communication with one of the inlet side or the outlet side of said reciprocating pump;
providing a second dampener device in fluid communication with said first dampener device, having a vertical axis connected to and in fluid communication with one of the inlet side or the outlet side of said reciprocating pump, said second dampener device comprising:
a fifth conduit through which process fluid flows;
a sixth conduit having a fist and second end connected to said first conduit, wherein said sixth conduit extends away from said fifth conduit generally along the vertical axis;
a seventh conduit having a first and second end connected to said fifth conduit, wherein said seventh conduit extends away from said fifth conduit generally along the vertical axis in opposing relationship to said second conduit;
a second dampener valve positioned on said fifth conduit;
an eighth conduit extending in opposing relation to said fifth conduit, said eight conduit extending between said sixth and seventh conduits; and
a second air valve connected to said eighth conduit;
dampening the industrial process fluid as the process fluid flows through the first and second dampener devices by applying pressurized air to the process fluid;
regulating the flow of the process fluid between the first and second dampener devices.

* * * * *